United States Patent [19]

Yamaguchi et al.

[11] Patent Number: 5,677,775
[45] Date of Patent: Oct. 14, 1997

[54] IMAGE FORMING APPARATUS PROVIDED WITH A DEVICE FOR CONTROLLING COMMUNICATION WITH A CENTRAL SUPERVISORY APPARATUS

[75] Inventors: Ikunori Yamaguchi, Toyokawa; Sumiaki Hirata, Aichi-ken; Kazunobu Maekawa, Toyokawa, all of Japan

[73] Assignee: Minolta Co., Ltd., Osaka, Japan

[21] Appl. No.: 366,105

[22] Filed: Dec. 29, 1994

[51] Int. Cl.⁶ ............................................ H04N 1/00
[52] U.S. Cl. .................. 358/468; 358/437; 399/11; 399/87
[58] Field of Search ...................... 358/400, 437, 358/405, 442, 468; 355/200, 201, 203–207; 399/11, 79–80, 87; 379/100; H04N 1/00

[56] References Cited

U.S. PATENT DOCUMENTS

| | | |
|---|---|---|
| 4,497,037 | 1/1985 | Kato et al. . |
| 4,549,044 | 10/1985 | Durham . |
| 4,583,834 | 4/1986 | Seko et al. . |
| 5,077,582 | 12/1991 | Kravette et al. . |
| 5,184,179 | 2/1993 | Tarr et al. . |
| 5,293,196 | 3/1994 | Kaneko et al. ............... 358/400 |
| 5,300,980 | 4/1994 | Maekawa et al. . |
| 5,373,349 | 12/1994 | Ito .................................. 358/438 |
| 5,390,003 | 2/1995 | Yamaguchi et al. .......... 355/201 |

Primary Examiner—Kim Vu
Attorney, Agent, or Firm—Burns, Doane, Swecker & Mathis, LLP

[57] ABSTRACT

A copying machine which detects its own condition, such as the surface potential of a photosensitive member and the toner density in a developer, and communicates with a central supervisory apparatus to transmit the detected data at a preset time or when a specified number of copies are made. The communication is controlled in accordance with the number of copies which have been made since the previous communication or the time which it has taken to make the specified number of copies since the previous communication. When the number of copies is smaller than a reference number or when the time is shorter than a reference time, the communication is canceled, or alternatively, the image forming apparatus sends the central supervisory apparatus such information. When regular communication is conducted, only items of data which have changed since the previous communication are transmitted.

18 Claims, 14 Drawing Sheets

F I G. 13

| DIP SW1 | DIP SW2 | DIP SW3 | PROCESSING REQUESTED |
|---|---|---|---|
| OFF | OFF | OFF | |
| OFF | OFF | ON | INPUT OF ID OF DT |
| OFF | ON | OFF | INPUT OF ID OF CENTER |
| OFF | ON | ON | INPUT OF TEL NO. OF CENTER |
| ON | OFF | OFF | |
| ON | OFF | ON | |
| ON | ON | OFF | |
| ON | ON | ON | SELECTION OF COM MODE |

F I G. 14

COUNT DATA

| TOTAL COPY COUNTER | TC |
|---|---|
| COPY COUNTERS BY SIZE | SC1, ..., SC8 |
| JAM COUNTERS BY PORTION | J1, ..., J16 |
| TROUBLE COUNTERS BY PORTION | TR1, ..., TR32 |
| PM COUNTERS BY PART | PM1, ..., PM48 |

ELEMENT DATA

| SHEET TRAVELING TIME | T1, ..., T8 |
|---|---|
| SURFACE POT OF PHOTO DRUM | V0 |
| TONER DENSITY IN DEVELOPER | C1 |
| DEVELOPING BIAS VOL | VB |
| VOLUME OF TONER ON PHOTO DRUM | C2 |
| GRID VOL OF CHARGER | VG |

IMAGE FORMING APPARATUS PROVIDED WITH A DEVICE FOR CONTROLLING COMMUNICATION WITH A CENTRAL SUPERVISORY APPARATUS

BACKGROUND OF THE INVENTION

1. Field of the Invention

The present invention relates to an image forming apparatus, and more particularly, to an image forming apparatus provided with a device for controlling communication with a central supervisory apparatus.

2. Description of Related Art

Image forming apparatuses such as copying machines, printers and facsimiles require exchanges of photosensitive members and toner containers, and checks and maintenance of other parts, in order to keep the picture quality. Servicemen visit users regularly to manage these things and at the users' request to cope with trouble.

However, as the number of such image forming apparatuses is increasing, the maintenance by servicemen on the spot becomes the limit. Therefore, a system for monitoring many image forming apparatuses with a central supervisory apparatus has been developed by using communication lines.

For example, Japanese Patent Laid Open Publication Nos. 2-34864 and 3-292046 disclose that data about the conditions of image forming apparatuses are transmitted to a central supervisory apparatus via communication lines.

The Publication No. 2-34864 teaches that data about the condition of each printer are transmitted to a central station at intervals of a specified time and/or at intervals of a specified number of printed pages. The publication No. 3-29046 teaches that each copying machine transmits data about its condition to a central supervisory apparatus at a set time. If the copying machine is off at the set time, the data to be transmitted are stored, and the next time the copying machine is turned on, the data are transmitted.

With respect to such systems as disclosed by the Publication Nos. 2-34864 and 3-29046, in order to improve the accuracy of the monitoring of the central supervisory apparatus, the image forming apparatuses of the users' side should be checked minutely, and the frequency of data transmission to the central supervisory apparatus should be raised.

However, a rise in the frequency of data transmission to the central supervisory apparatus causes problems to each user that it costs more for communication and that the communication line is occupied by the apparatus more often. Meanwhile, the communication line of the central supervisory apparatus becomes busier, and the possibility that the users' apparatuses cannot reach the central supervisory apparatus becomes higher. Thus, on the contrary, the service will be poorer.

SUMMARY OF THE INVENTION

An object of the present invention is to lower the occupancy of the communication line of each user by the image forming apparatus to lower the communication cost of the user without lowering the accuracy of monitoring of a central supervisory apparatus.

Another object of the present invention is to ease the business of the communication line of the central supervisory apparatus.

In order to attain the objects, an image forming apparatus according to the present invention detects its own condition, such as the surface potential of a photosensitive member and the toner density in a developer, and communicates with a central supervisory apparatus to transmit the detected data at intervals of a specified time or of a specified number of imaged sheets. The communication with the central supervisory apparatus is controlled in accordance with the number of imaged sheets which were made during the specified time or with the time which it took to make the specified number of imaged sheets. When the number of imaged sheets which were made during the specified time is smaller than a reference number, the communication is canceled, or alternatively, the image forming apparatus sends the central supervisory apparatus information that the number of imaged sheets is smaller than the reference number. When the time which it took to make the specified number of imaged sheets is shorter than a reference time, the communication is canceled, or alternatively, the image forming apparatus sends the central supervisory apparatus information that the time which it took to make the specified number of imaged sheets is shorter than the reference time.

With the control, depending on the number of imaged sheets during the specified time and the time it took to make the specified number of imaged sheets, the frequency of communication and the volume of transmitted data can be decreased, and the efficiency of communication is increased.

The image forming apparatus according to the present invention further comprises a memory for storing data transmitted to the central supervisory apparatus, that is, data about the condition of the image forming apparatus at a time of communication with the central supervisory apparatus, comparison means for comparing the data stored in the memory and currently detected data about the condition of the image forming apparatus, and communication control means for controlling communication with the central supervisory apparatus in accordance with a result of the comparison means. When the currently detected data are judged to be substantially equal to those stored in the memory, the communication is canceled, or the image forming apparatus sends the central supervisory apparatus information that the condition has not changed. Alternatively, the communication control means controls such that the image forming apparatus sends only items of data which have changed since the previous communication.

With the control, only significant data are transmitted to the central supervisory apparatus. Thereby, the frequency of communication and the volume of transmitted data can be decreased, and the efficiency of communication is increased.

BRIEF DESCRIPTION OF THE DRAWINGS

These and other objects and features of the present invention will be apparent from the following description with reference to the accompanying drawings, in which:

FIG. 13 is a table showing the states of dip switches and the requested processing; and FIG. 14 is a table showing the items of count data and element data.

DETAILED DESCRIPTION OF THE PREFERRED EMBODIMENTS

A preferred embodiment of the present invention is described with reference to the accompanying drawings.

(1) Structure of a Remote Supervisory System

A remote supervisory system which includes an embodiment of the present invention is described. The system comprises copying apparatuses, data terminals, a communication network and a center (central supervisory apparatus).

(1-1) General Structure

Figure 1:
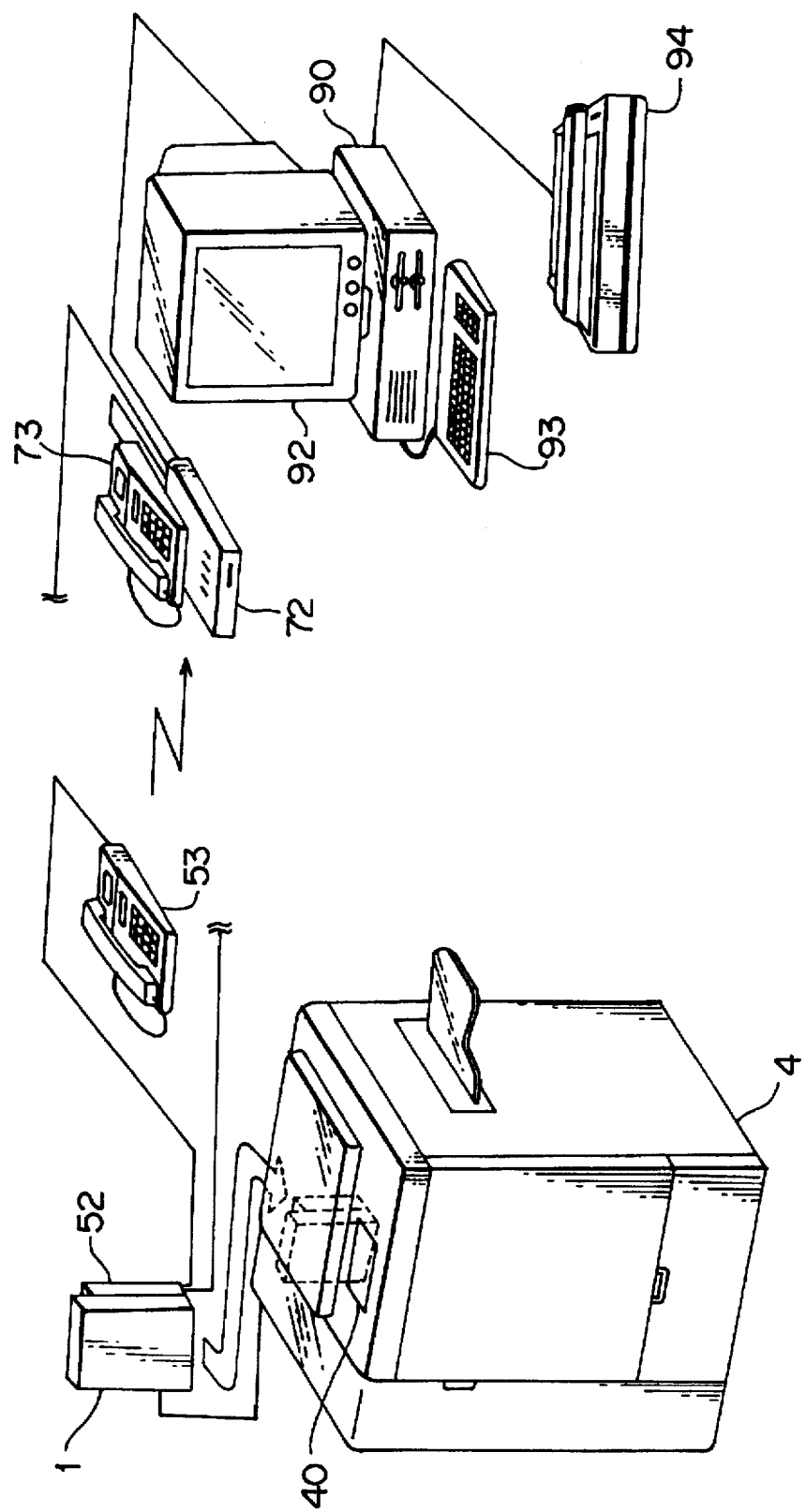
FIG. 1 is a schematic view of a system including an embodiment of the present invention.
Figure 2:
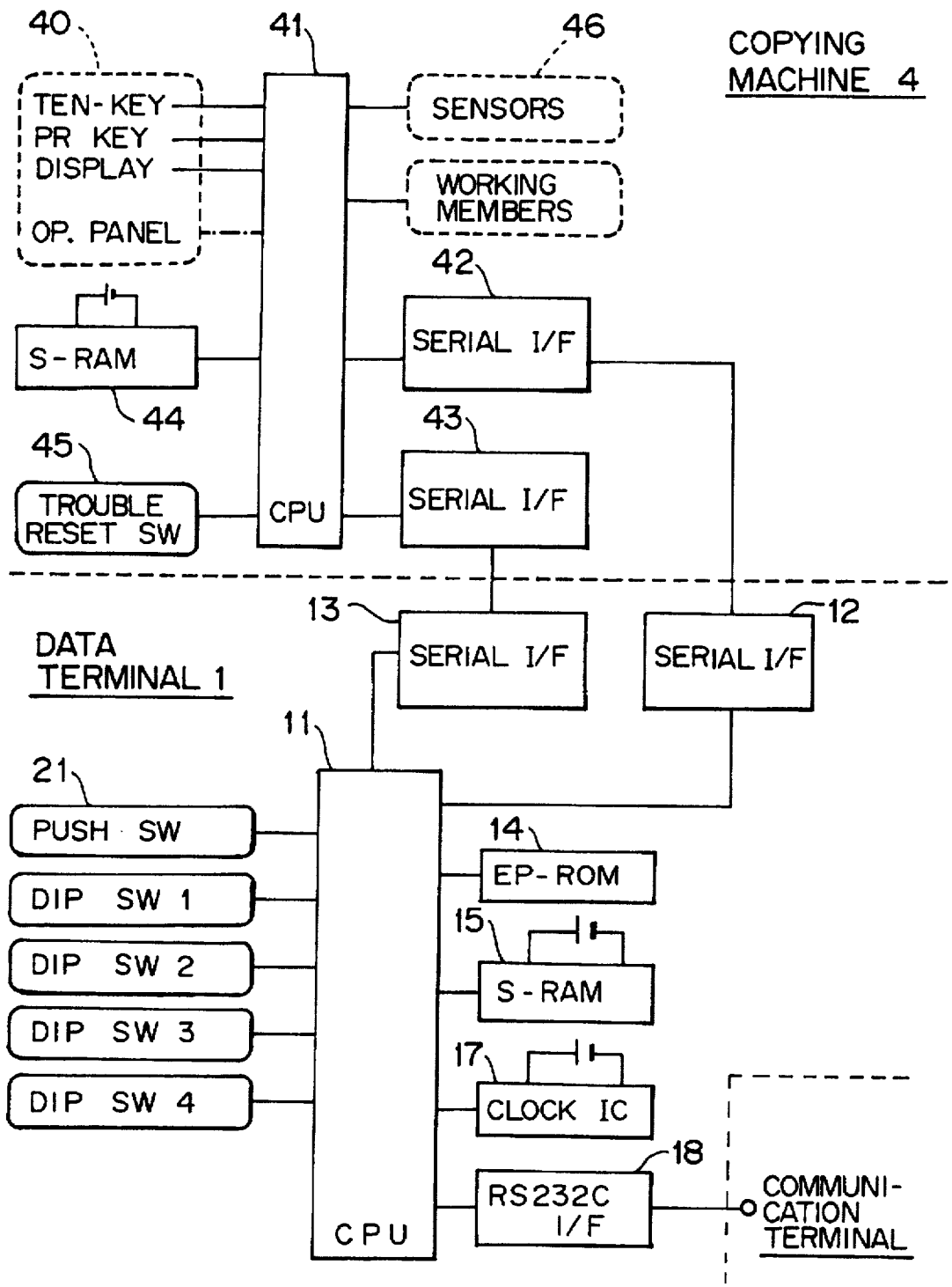
FIGS. 2 and 3 are block diagrams of the system including the embodiment.
Figure 3:
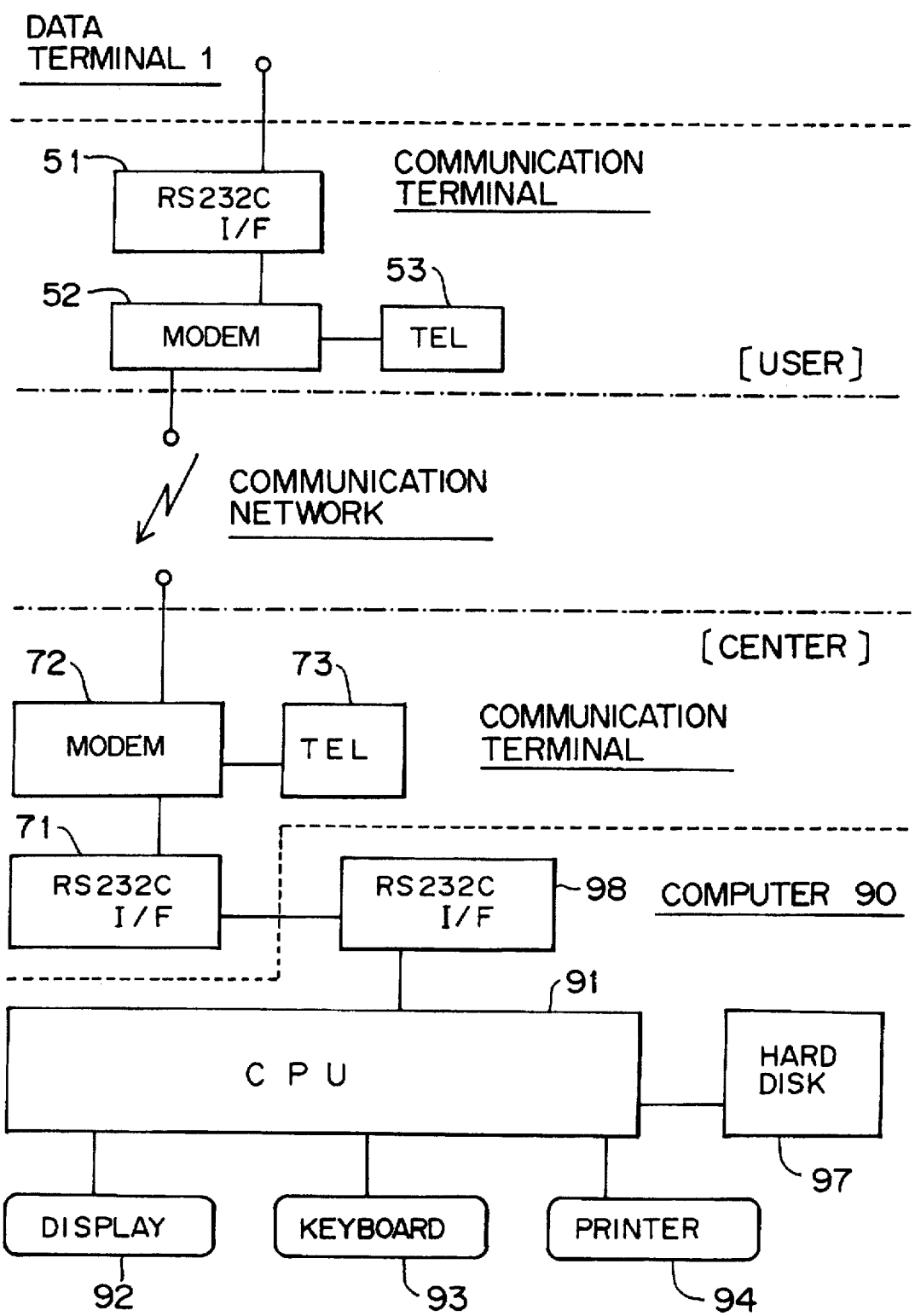

FIG. 1 is an illustration of the system. FIGS. 2 and 3 are block diagrams of the circuitry of the system. The system comprises apparatuses of users' side (one of the users' apparatuses is shown in the drawings), a central supervisory apparatus (center), and a communication network which connects the users' apparatuses to the center.

Each apparatus of the users' side comprises a copying machine 4, a data terminal 1 which collects data about the condition of the copying machine 4, a modem 52 which acts as a communication terminal for calling up a modem 72 of the center, and an ordinary telephone 53 which the modem 52 is attached to.

The center comprises a computer 90 incorporating a CPU 91, a modem 72 which acts as a communication terminal for calling up the modems 52 of the users' apparatuses by order of the computer 90, and an ordinary telephone 73 which the modem 72 is attached to. A hard disc 97, a display 92, a keyboard 93 and a printer 94 are connected to the CPU 91.

The data terminal 1 of the user's apparatus reads data (count data and element data shown in FIG. 14) about the condition of the copying machine 4, processes the data, and stores the processed data in an SRAM 15. Then, the data terminal 1 transmits the data to the computer 90 of the center regularly (at intervals of a specified time and at intervals of a specified number of copies) and also on occasions of trouble.

The computer 90 of the center stores data transmitted from the data terminals 1 of the users' apparatuses in the hard disc 97, and carries out processing for managing the copying machines 4 based on the data transmitted from the respective data terminals 1. For example, based on the number of copies, the computer 90 calculates the copy fee. When receiving data indicating trouble, the computer 90 informs the user of the estimated time of sending a serviceman and gives a serviceman instructions.

(1-2) Copying Machine 4

The copying machine 4 scans an original to make copies thereof.

In the copying machine 4, sensors 46 disposed in various portions detect matters which influence the copying process as element data, such as the copy sheet traveling time, the surface potential of the photosensitive drum, the toner density in the developer, the developing bias voltage, the volume of toner stuck on the photosensitive drum and the grid voltage of the charger. The sensors 46 also detect trouble to be checked by a serviceman as trouble data, such as the end of the life of the exposure lamp, poor fixation, the end of the life of the heater and abnormal discharge of the charge wire. These data are taken in a CPU 41 of the copying machine 4 and processed therein, and the data are transmitted to a CPU 11 of the data terminal 1 through serial interfaces 43 and 13.

Also, in the CPU 41, counter values which become a base of calculation of the copy fee in the center and counter values which become a base of maintenance are read out. The counters for the former purpose are a total copy counter which count all the ejected copy sheets and copy counters by size which count used copy sheets of the respective sizes. The counters for the latter purpose are jam counters by portion which count occurrences of sheet jamming in the respective portions, trouble counters by portion which count occurrences of trouble in the respective portions and PM counters by part which count times of use of the respective parts. The read counter values are transmitted to the CPU 11 of the data terminal 1 as count data through serial interfaces 42 and 12.

Figure 4:
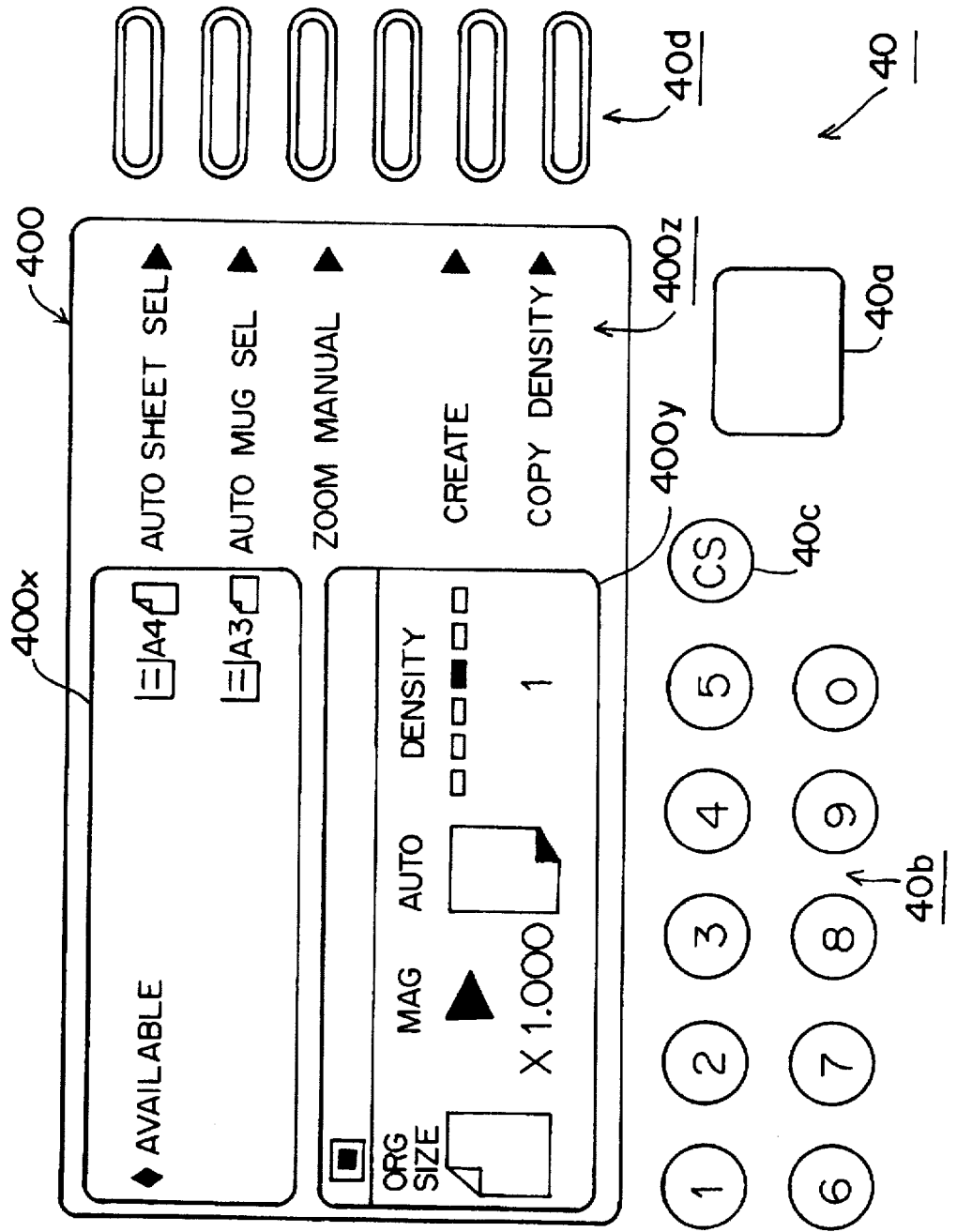
FIG. 4 is an illustration of an operation panel of a copying machine which is connected to the embodiment.

The CPU 41 of the copying machine 4 also receives signals from key switches provided on an operation panel 40 (see FIG. 4), such as a print key 40a for a start of copying operation, a ten-key 40b for input of numbers, a clear/stop key 40c for a clear of input and a stop of copying operation, and function keys 40d, etc., and from other switches, such as a trouble reset switch 45, and in accordance with the signals, the CPU 41 controls the operation and the mode of the copying machine 4.

From the CPU 41, signals for driving a liquid crystal display panel 400 on the operation panel 40 are sent out. The display panel 400 is divided into a message block 400x, a copy mode block 400y and a multi-function block 400z. The message block 400x displays the state of the copying machine 4, such as whether copying operation is possible or impossible, and emptiness of paper and/or toner. The copy mode block 400y displays the set conditions of the copying operation, such as the number of copies, the sheet size, the copy density, the copy magnification, the copy create, etc. The multi-function block 400z is for interactive setting of the automatic sheet selection, the automatic magnification selection, the zoom magnification selection, the create and the density, etc. by use of the function keys 40d. The message block 400x also displays the action of the modem 52 of the data terminal 1 and messages from the center when trouble occurs.

A RAM 44 is connected to the CPU 41 and is stored with the model number and the serial number of the copying machine 4, which are input at the time of shipment from the factory. Then, when the data terminal 1 is installed, the CPU 41 transmits the model number and the serial number to the CPU 11 of the data terminal 1 through the serial interfaces 42 and 12 by a request of the CPU 11. The RAM 44 is also stored with words to be displayed in the message block 400x.

(1-3) Data Terminal 1

The data terminal 1 receives data from the copying machine 4 connected thereto and processes the data. When it comes to one of predetermined cases to communicate with the center, for example, when it becomes a predetermined time, when the number of copies becomes a predetermined number, or when trouble occurs, the data terminal 1 drives the modem 52 to reach the communication line of the center and transmits data about the condition of the copying machine 4 (element data, count data, trouble data, etc.) to the CPU 91 of the center.

The CPU 11 of the data terminal 1 is connected to the modem 52 which acts as a communication terminal by communication interfaces (RS232C) 18 and 51, and the modem 52 can be connected to the modem 72 of the center by a telephone line.

The contents of the data transmitted from the CPU 11 to the CPU 91 of the center depend on the case. For example, when trouble occurs, data which indicate the kind of the trouble, etc. are transmitted. When the data terminal 1 is installed, identification data of the copying machine 4 (the model number and the serial number) and of the data terminal 1 are transmitted. In regular data transmission which is carried out at intervals of a specified time and at intervals of a specified number of copies, element data and count data are transmitted.

A ROM 14 which is stored with control programs, a battery backup type SRAM 15 which is to be stored with identification data, trouble data, element data and count data, and a battery backup type internal clock 17 are connected to the CPU 11. The CPU 11 is connected to the CPU 41 of the copying machine 4 by the connections between the serial interfaces 12 and 42 and between the serial interfaces 13 and 43, and thereby, the CPU 11 can receive data from the CPU 41. The CPU 11 has a push switch 21 and four dip switches (DIP.SW1, DIP.SW2, DIP.SW3, DIP.SW4). These switches will be described in detail later.

(1-4) Computer 90

The CPU 91 is the main component of the computer 90. The modem 72 is attached to the CPU91 by a connection between a communication interface (RS232C) 71 of the modem 72 and a communication interface (RS232C) 98 of the CPU 91, and the modem 72 acts as a communication terminal. This computer 90 monitors a lot of copying machines 4 through the respective data terminals 1.

From the data terminals 1 of the users' apparatuses, element data, count data and trouble data, etc. are transmitted to the modem 72 via the communication network, and the data are sent to the CPU 91 through the communication interfaces (RS232C) 71 and 98.

The CPU 91 processes the data. Supervisory data about the respective copying machines 4 are made, and the data are stored in the respective areas of the hard disc 97. At the end of every month, the amounts of money to be charged the users are calculated from the data, and bills are printed out. In periodic communication (regular communication at intervals of a specified time) or copy number communication (regular communication at intervals of a specified number of copies) with a user, the CPU 91 sends the time of next periodic communication or the copy number of next copy number communication to the data terminal 1 of the user. In communication with a user at a time of trouble, the CPU 91 informs the user of the estimated time of sending a serviceman and gives instructions (visiting time, parts to be carried, etc.) to a serviceman.

(2) Control of the System

The control of the system is described with reference to the processing of the CPU 41 and the processing of the CPU 11.

(2-1) Processing of the CPU 41 of the Copying Machine 4

Figure 5:
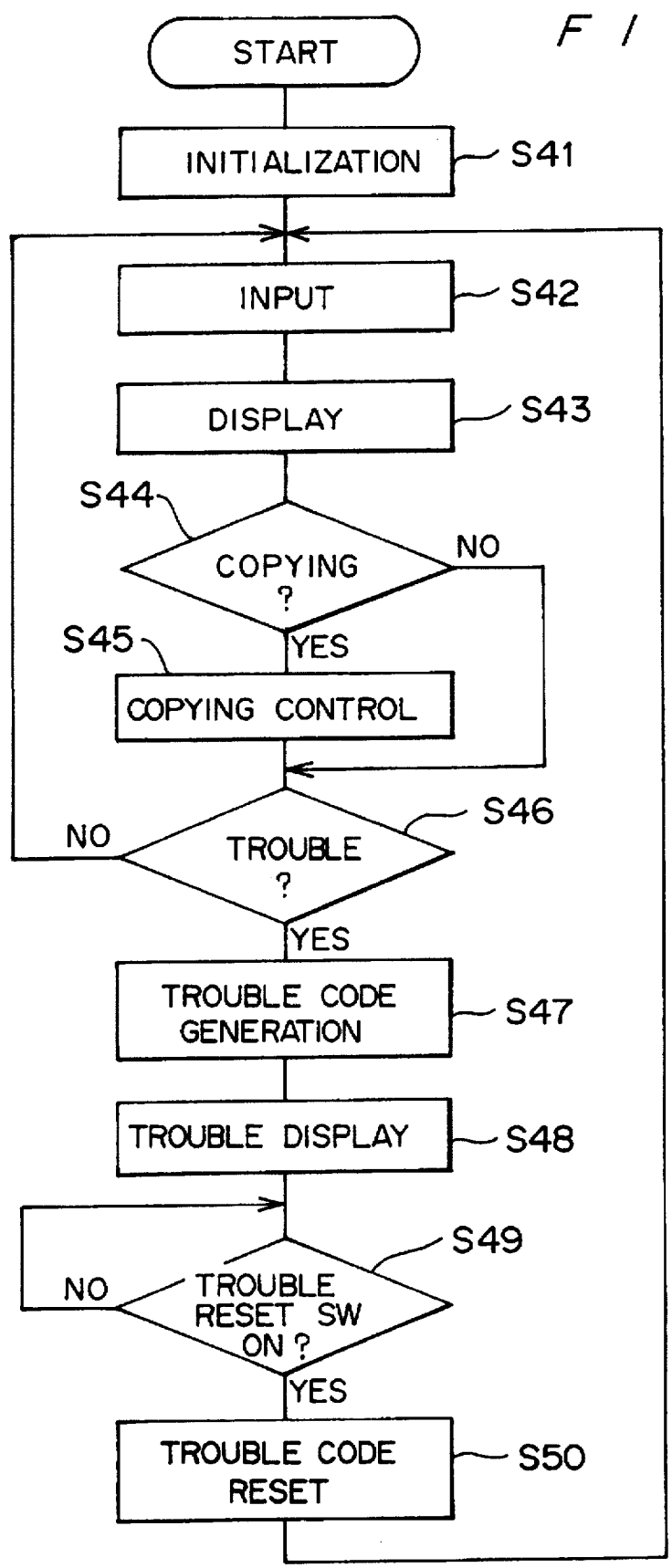
FIG. 5 is a flowchart showing the procedure carried out by a CPU of the copying machine.
Figure 6:
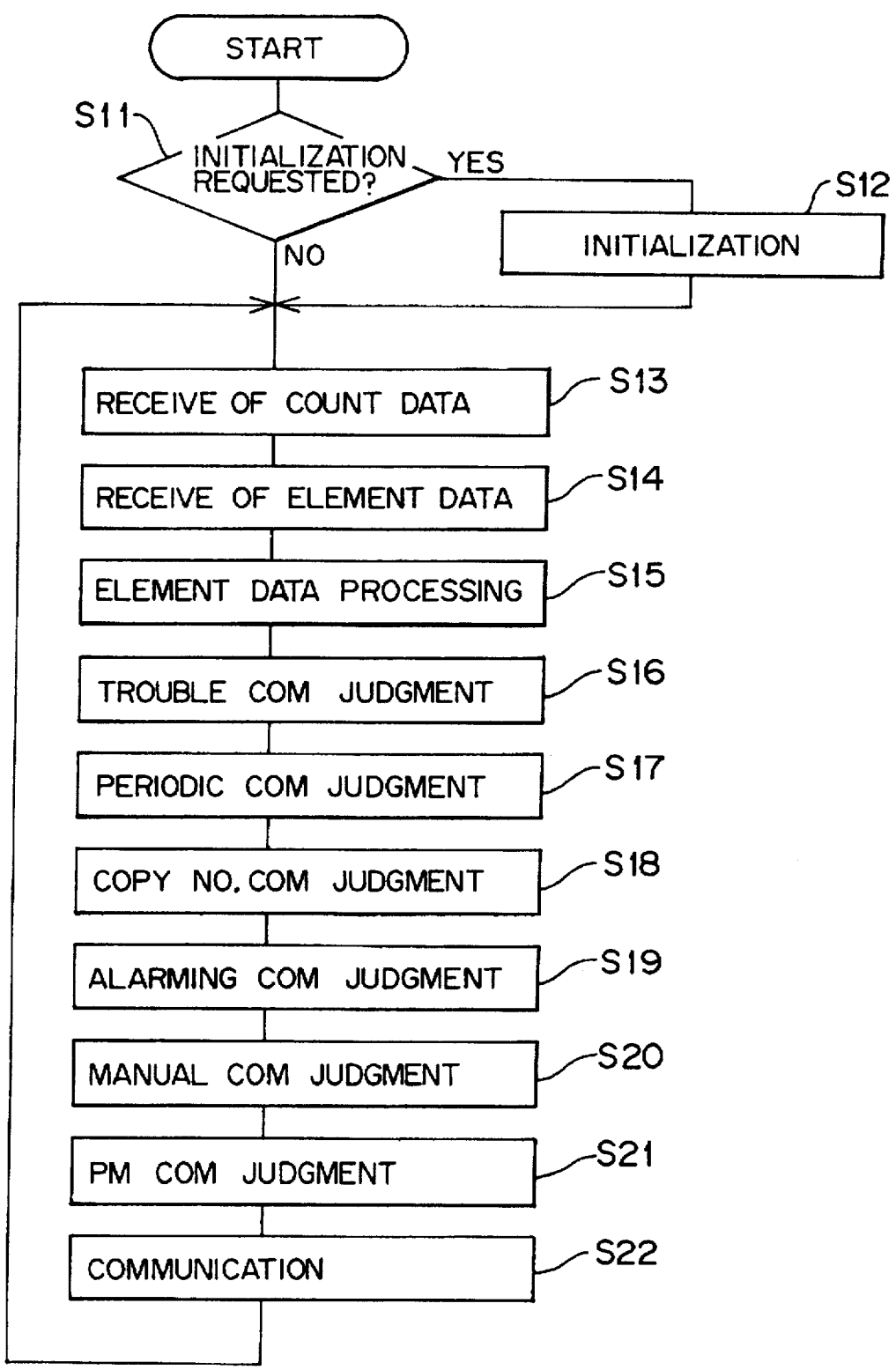
FIG. 6 is a flowchart showing the procedure carried out by a CPU of the embodiment.

FIG. 5 is a flowchart of a procedure carried out by the CPU 41 of the copying machine 4.

The procedure starts, for example, at a time of turning on the copying machine 4. First, the memories are cleared, and initialization is carried out at step S41. Thereafter, loop processing after step S42 is carried out repeatedly.

Step S42 is a step of receiving input signals. The input signals are, for example, signals entered by use of the key switches on the operation panel 40, signals sent from trouble sensors provided in various portions of the copying machine 4, and signals sent from the CPU 11. Step S43 is a step of displaying the state of the copying machine 4, the operation mode, etc. on the display panel 400 of the operation panel 40.

While the copying machine 4 is operating to make copies ("YES" at step S44), the CPU 41 carries out necessary processing for copying operation at step S45. The processing carried out at step S45 includes sheet feeding, scanning control, and control of image forming elements such as the photosensitive drum and the developing device. Further, every time a processed sheet is ejected from the copying machine 4, element data and count data are transmitted to the CPU 11.

When a sheet jam or some other trouble (the end of the life of the exposure lamp, poor fixation, the end of the life of the heater, abnormal discharge from the charge wire, etc.) occurs ("YES" at step S46), a trouble code which indicates the kind of the trouble is transmitted to the CPU 11 at step S47. Then, the CPU 11 transmits the trouble code to the center. At step S48, messages about the trouble are displayed in the message block 400x of the display panel 40.

First, a message, "trouble has occurred" is displayed. Then, when the data terminal 1 actuates the modem 52, a message, "the machine is reaching the center" is displayed. Thereafter, the data terminal 1 reaches the communication line to the modem 72, and when the CPU 11 is connected with the CPU 91 of the center, a message, "the machine is on line with the center" is displayed. The data terminal 1 receives data about the estimated time of having a serviceman, etc. from the center, and a message, "a service man will arrive at \*\*:\*\*" is displayed.

After managing the trouble, the serviceman turns on the trouble reset switch 45 ("YES" at step S49), and thereby, a trouble reset signal is sent to the CPU 11 at step S50. The CPU 11 receives the trouble reset signal and transmits a message to the center that the machine has recovered. After the reset of trouble, the message block 400x of the display panel 40 becomes back in the usual state.

(2-2) Processing of the CPU 11 of the Data Terminal 1

The CPU 11 of the data terminal 1 carries out processing shown by flowcharts of FIGS. 6 through 9, 11 and 12.

(2-2-1) Initialization

If the dip switch DIP.SW4 is on at a time of turning on the copying machine 4, which requests initialization ("YES" at step S11), initialization is carried out at step S12. The processing at the initialization step S12, as shown in FIG. 13, depends on the on/off states of the dip switches DIP.SW1, DIP.SW2 and DIP.SW3.

For example, when the copying machine 4 is turned on while the dip switches DIP.SW1, DIP.SW2 and DIP.SW3 are off, off and on respectively, it requests input of the ID of the data terminal 1. A number is input by use of the ten-key 40b, and the print key 40a is pressed. Thereby, the input number is stored in the SRAM 15 as the ID of the data terminal. Thereafter, the copying machine 4 is turned off once. However, since the SRAM 15 has a backup battery, the SRAM 15 keeps the ID of the data terminal.

When the copying machine 4 is turned on while the dip switches DIP.SW1, DIP.SW2 and DIP.SW3 are off, on and off respectively, it requests input of the ID of the center. A number is input by use of the ten-key 40b, and the print key 40a is pressed. Thereby, the input number is stored in the SRAM 15 as the ID of the center. Thereafter, the copying machine 4 is turned off once. However, since the SRAM has a backup battery, the SRAM 15 keeps the ID of the center.

When the copying machine 4 is turned on while the dip switches DIP.SW1, DIP.SW2 and DIP.SW3 are off, on and on respectively, it requests input of the telephone number of the center. A number is input by use of the ten-key 40b, and the print key 40a is pressed. Thereby, the input number is stored in the SRAM 15 as the telephone number of the center. Thereafter, the copying machine 4 is turned off once. However, since the SRAM has a backup battery, the SRAM 15 keeps the telephone number of the center.

In this way, the ID of the data terminal, the ID of the center and the telephone number of the center are stored in the SRAM 15.

When the copying machine 4 is turned on while the dip switches DIP.SW1, DIP.SW2 and DIP.SW3 are all on, it requests selection of communication mode. This is to select the mode of communication with the center when the communication is not significant and not necessary. More specifically, in carrying out periodic communication, when only a small number of copies have been made since the previous periodic communication, the communication is not necessary. In carrying out copy number communication, when it is only a short time since the previous copy number communication, the communication is not necessary. There are mode 1, mode 2 and mode 3 as options for the former case, and there are mode 4, mode 5 and mode 6 as options for the latter case. The selections from these modes are made as follows.

First, one of the numbers 1, 2 and 3 is input by use of the ten-key 40b, and continuously one of the numbers 4, 5 and 6 is input by use of the ten-key 40b. Then, the print key 40a is pressed, and thereby, the input numbers are stored in the SRAM 15 as the modes of communication in the above-described cases. For example, by inputting 2 and 4 by use of the ten-key 40b and pressing the print key 40a thereafter, the mode 2 and the mode 6 are selected and stored in the SRAM 15. Then, the copying machine 4 is turned off once. However, since the SRAM 15 has a battery backup, the SRAM 15 keeps the selected data transmission modes.

(2-2-2) Ordinary Processing

If the dip switch DIP.SW4 is off at a time of turning on the copying machine 4 ("NO" at step S11), the processing is carried out following steps S13 through S22.

Every time a processed sheet is ejected from the copying machine 4, count data are transmitted to the CPU 11 and are stored in the SRAM 15 at step S13, and element data are transmitted and stored in the SRAM 15 at step S14. At step S15, element data of each item are processed to calculate the average and the variance, and the average and the variance are stored in the SRAM 15. When data are not transmitted from the copying machine 4 within a specified time after ejection of a sheet, it is checked at step S16 whether a trouble code is transmitted from the CPU 41 to determine whether trouble communication should be carried out.

Step S17 is a step of determining whether periodic communication should be carried out. More specifically, the present time of the clock 17 is compared with the time of next periodic communication stored in the SRAM 15. Step S18 is a step of determining whether copy number communication should be carried out. More specifically, the value of the total copy counter received at step S13 is compared with the copy number stored in the SRAM 15. Step S19 is a step of determining whether alarming communication should be carried out. More specifically, it is checked whether the addition of the average and the variance of each item of element data is over a threshold value stored in the SRAM 15. Step S20 is a step of determining whether manual communication should be carried out. It is checked whether the push switch 21 is pressed. Step S21 is a step of determining whether PM communication should be carried out. It is checked whether, after an exchange of parts, the corresponding PM counter is reset.

When communication with the center is requested at any one of the steps S16 through S21, communication is carried out at step S22. First, the modem 52 is actuated to call up the modem 72 of the center, and the modem 52 transmits the ID of the center. When the ID is correct, the ID of the data terminal is transmitted to the center, and then, exchange of information is carried out following the procedure shown by FIG. 7. If the modem 52 cannot reach the communication line of the center within a specified period, if the ID of the center is incorrect, or if the data terminal does not receive data from the center within a specified time after completion of sending data, an error message is displayed in the message block 400x of the operation panel 40.

Figure 7:
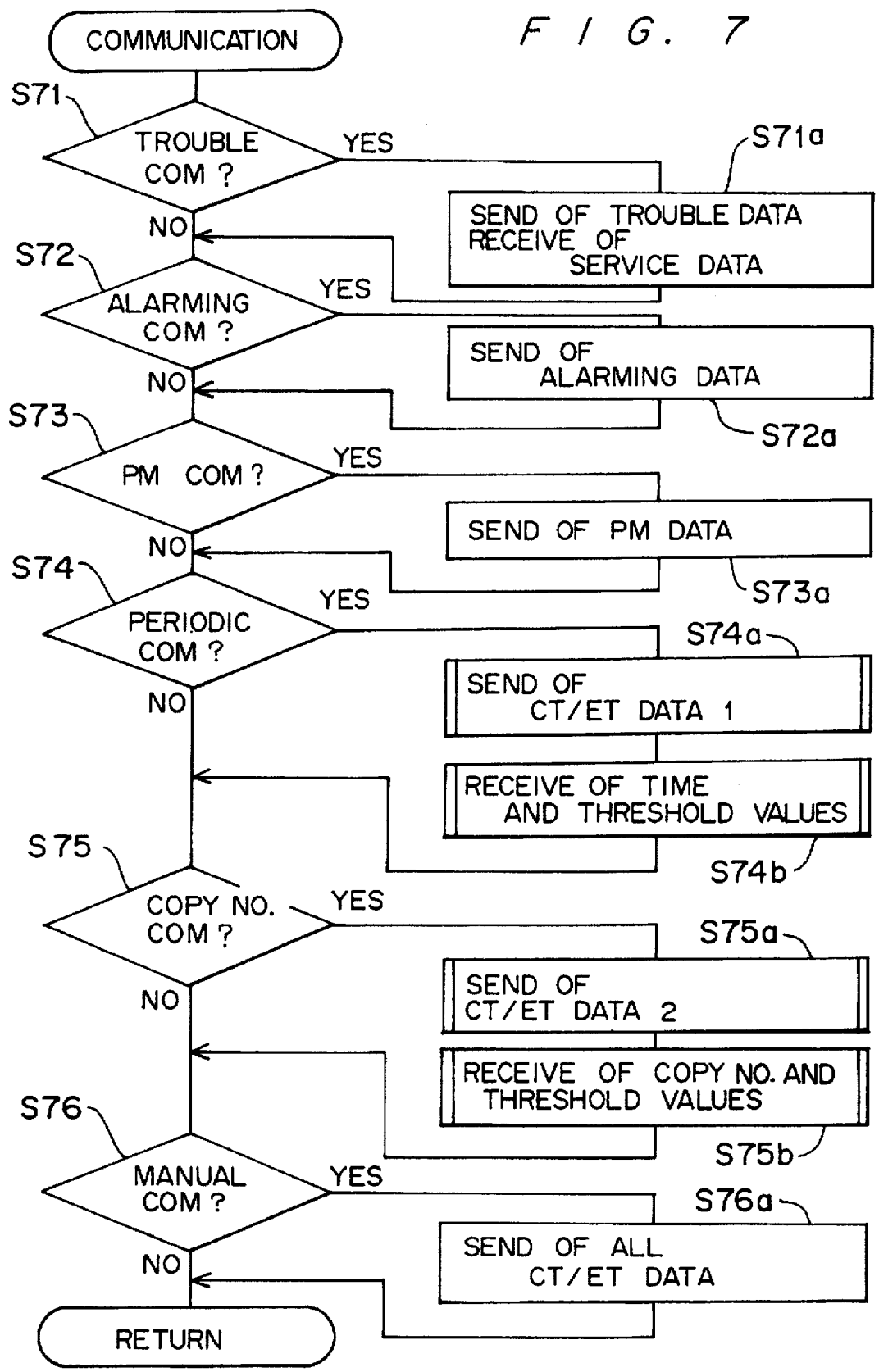
FIG. 7 is a flowchart showing the procedure of communication with a center carried out in the flowchart of FIG. 6.

Referring to FIG. 7, communication with the center is described.

When trouble communication is to be carried out ("YES" at step S71), at step S71a, a trouble code which indicates the kind of the trouble is transmitted to the center, and service data, such as the estimated time of having a serviceman, are sent from the center. When alarming communication is to be carried out ("YES" at step S72), alarming data which indicate the necessity of maintenance of any part are transmitted to the center at step S72a. When PM communication is to be carried out ("YES" at step S73), PM data which indicate the completion of an exchange of parts are transmitted to the center at step S73a.

Figure 8:
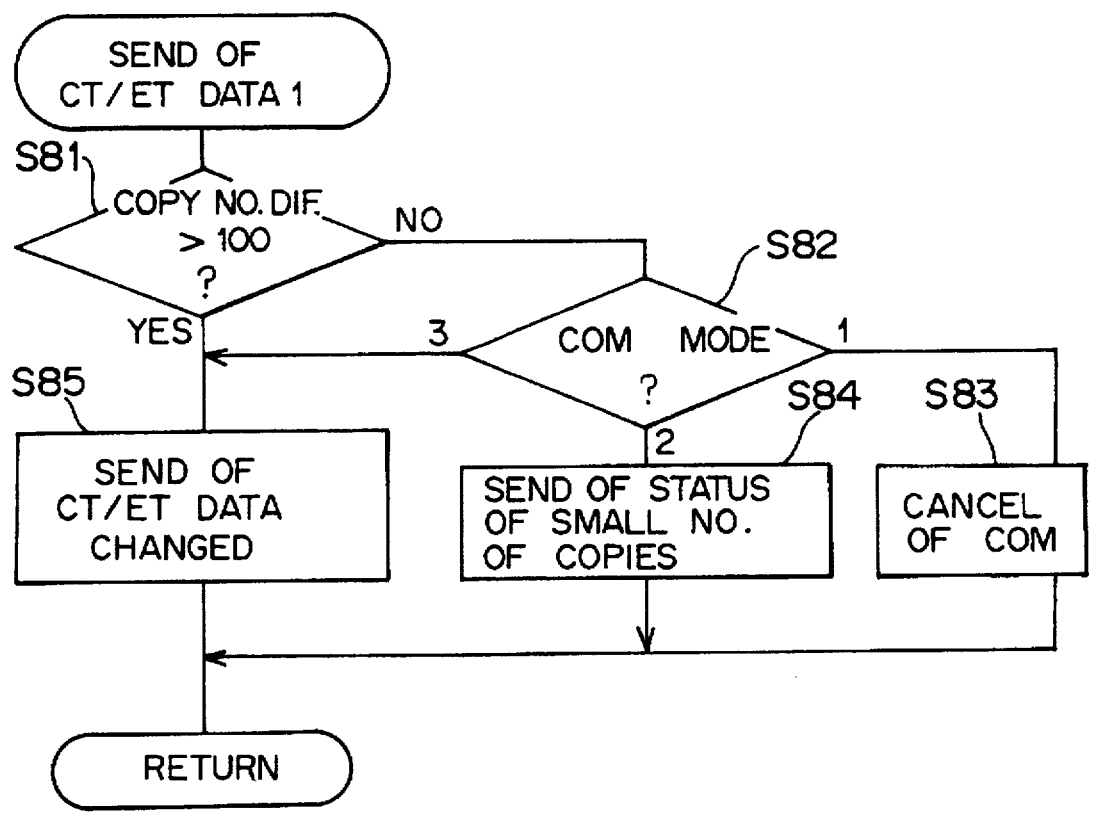
FIG. 8 is a flowchart showing the procedure of a first mode of count data/element data transmission carried out in the flowchart of FIG. 7.

When periodic communication is to be carried out ("YES" at step S74), count data and element data are transmitted in a first mode at step S74a following a procedure shown by FIG. 8. The current value of the total copy counter is compared with the value of the same counter at the previous periodic communication, and if the difference between the values is over 100 ("YES" at step S81), items of count data and element data which have changed since the previous periodic communication are transmitted to the center at step S85.

If the difference between the values of the total copy counter is not more than 100 ("NO" at step S81), the communication is carried out according to the mode selected by use of the dip switches. For example, if mode 1 is selected, the communication is canceled at step S83. If mode 2 is selected, a status which indicates that a small number of copies have been made since the previous periodic communication is sent at step S84. If mode 3 is selected, count data and element data are transmitted to the center at step S85 in the same manner as the case wherein the difference between the counter values is over 100. Further, as a possible modification of mode 1, in the next communication (for example, alarming communication) after the cancellation at step S83, a status which indicates that the previous periodic communication was canceled is sent.

Figure 10:
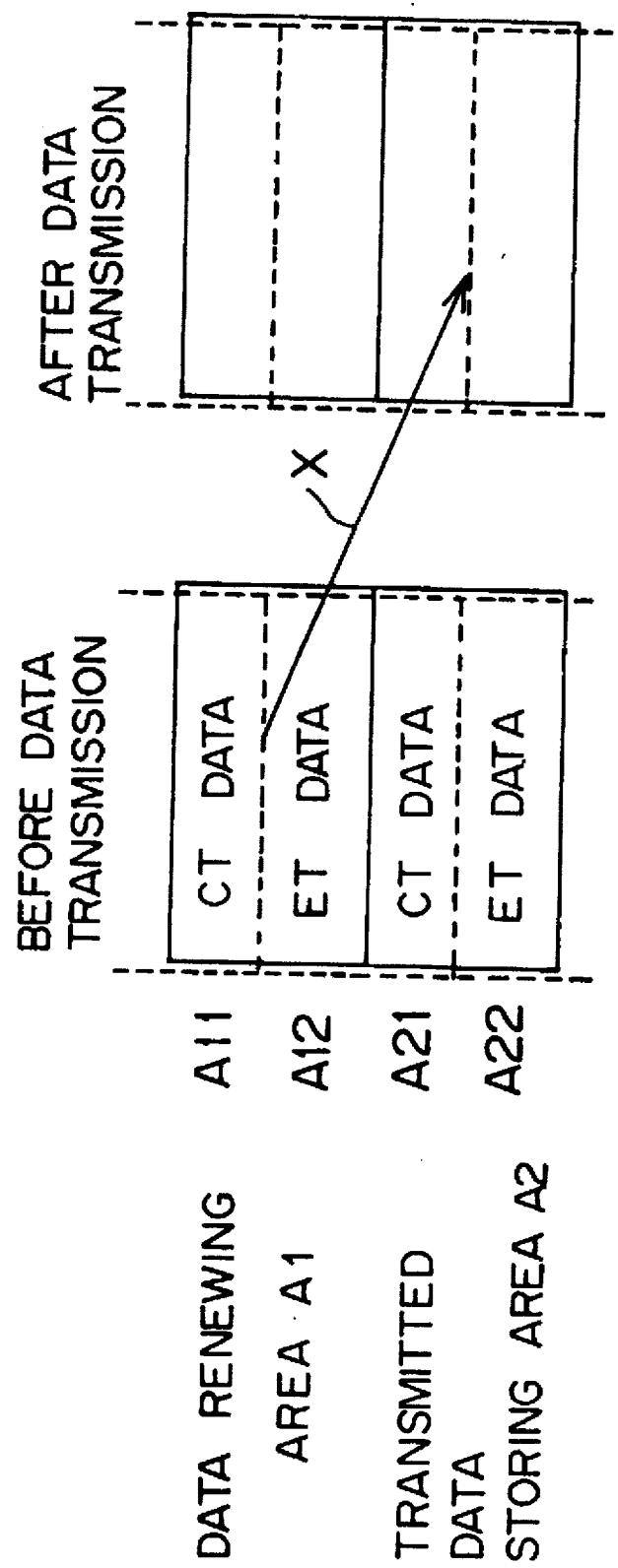
FIG. 10 is an illustration of an SRAM showing transfer of data.
Figure 11:
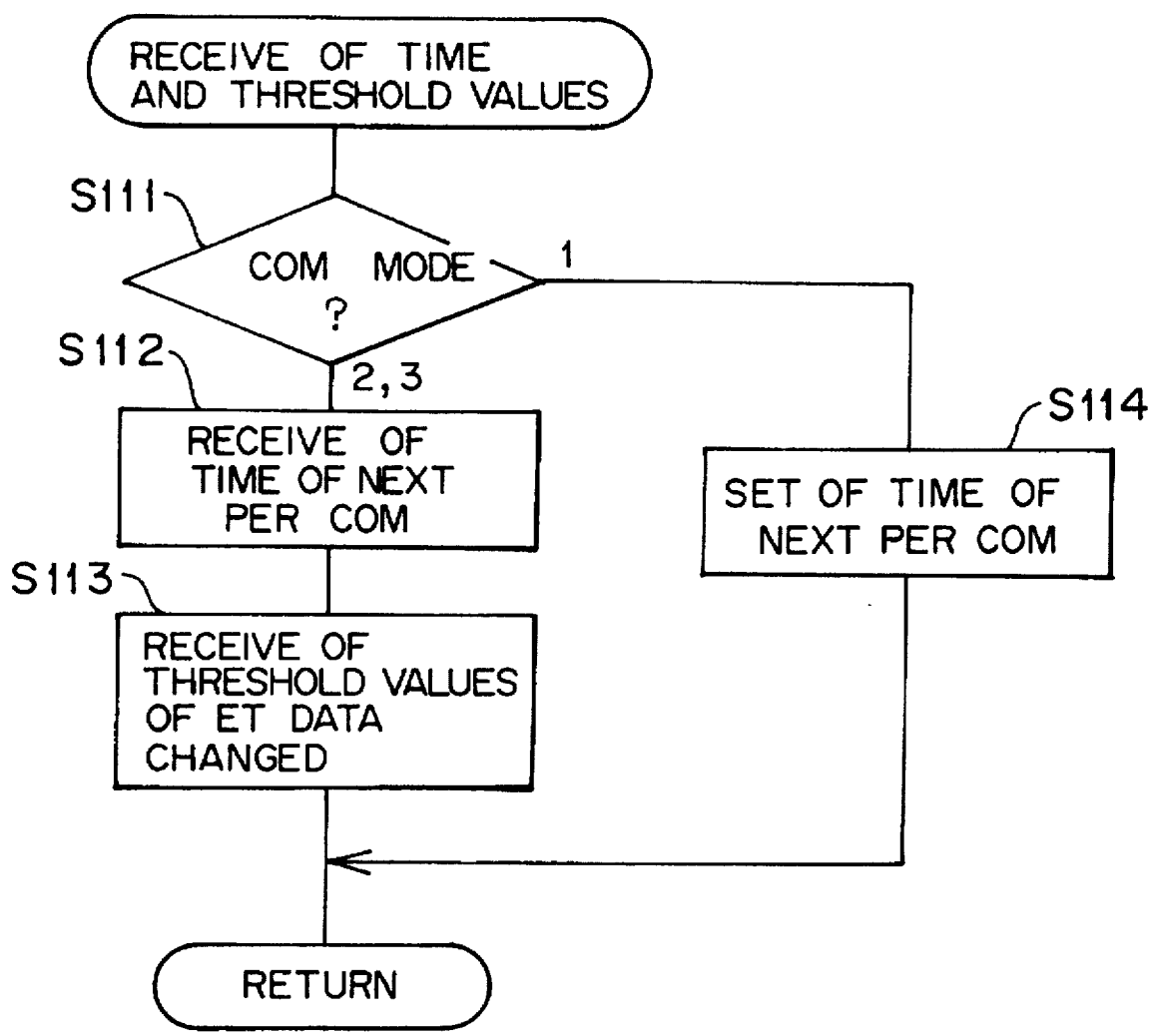
FIG. 11 is a flowchart showing the procedure of receiving data from the center in periodic communication.
Figure 12:
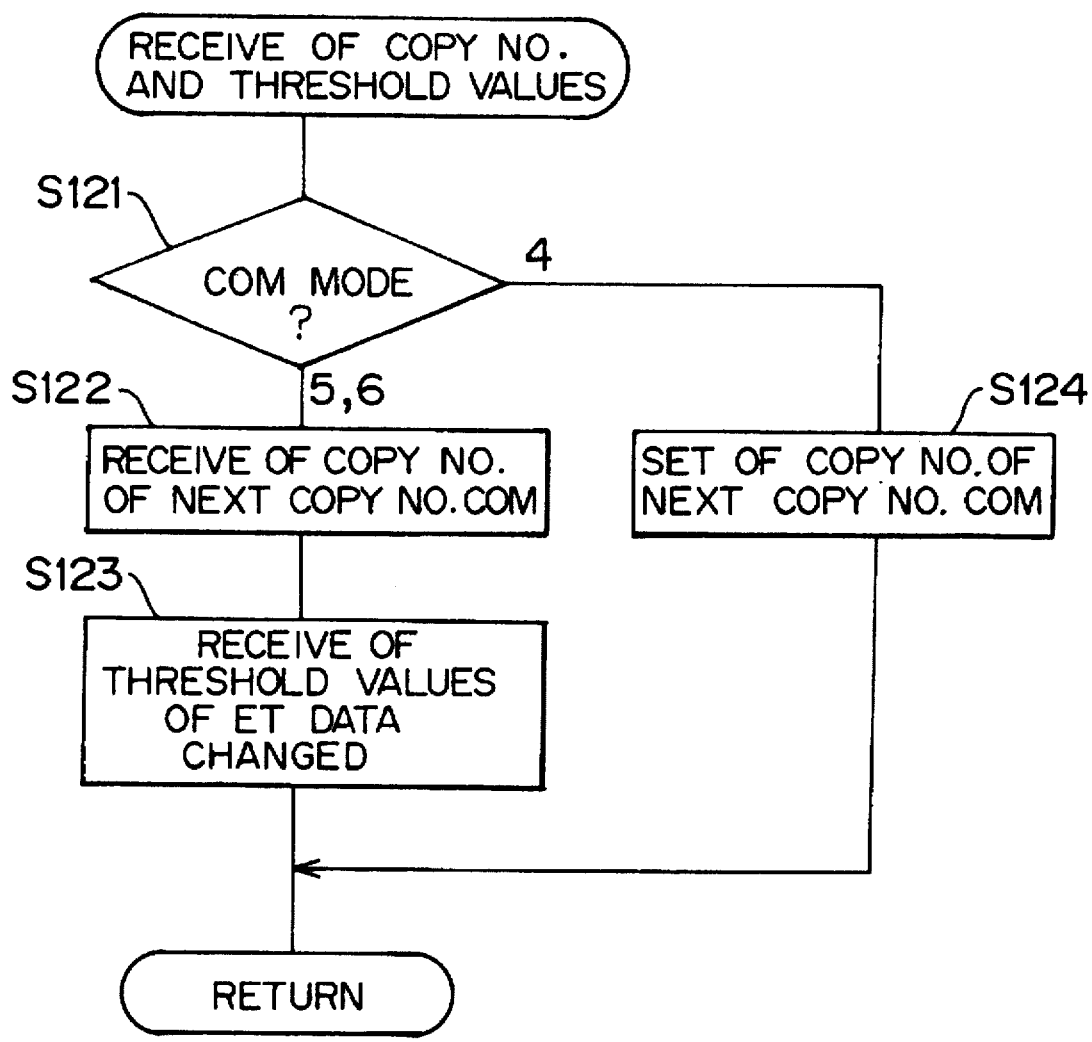
FIG. 12 is a flowchart showing the procedure of receiving data from the center in copy number communication.

The judgment at step S81 is possible because the SRAM 15 has a data renewing area A1 and a transmitted data storing area A2 (see FIG. 10). The data renewing area A1 has the latest data sent from the copying machine 4, and the transmitted data storing area A2 keeps data which were transmitted to the center in the previous periodic communication. At the time of data transmission to the center, data are transferred from the data renewing area A1 to the transmitted data storing area A2 as indicated by X in FIG. 10. The judgment at step S81 is made by comparing data in these two areas. The element data stored in the areas A1 and A2 are the average and variance of each item. At step S85, the count data A11 in the data renewing area A1 are compared with the count data A21 in the transmitted data storing area A2, and the element data A12 in the data renewing area A1 are compared with the element data A22 in the transmitted data storing area A2. Further, it is possible to control the communication in accordance with the comparison result at step S85. For example, when the data A11 and A12 in the renewing area A1 are equal or so similar as to be regarded equal to the data A21 and A22 in the transmitted data storing area A2, the communication is canceled. In this case, it is possible to send information that the count data and the element data are very similar to those transmitted in the previous periodic communication.

The count data stored in the SRAM 15, as shown in FIG. 14, mean the value of the total copy counter, the value of the copy counter by size, the value of the jam counter by portion, the value of the trouble counter by portion and the value of the PM counter by part. The element data stored in the SRAM 15 mean the sheet traveling time, the surface potential of the photosensitive drum, the toner density of the developer, the developing bias voltage, the amount of toner stuck on the photosensitive drum and the grid voltage of the charger. The total volume of the count data and the element data are approximately 2 kilobytes. In order to transmit all the count data and the element data to the center, it takes approximately 15 seconds at a speed of 1200 bits per second. However, since only the data which have changed since the previous communication are transmitted at step S85, the data transmission time can be shortened to about 1/10 on average.

Additionally, the SRAM 15 is stored with data which are sent from the center during communication with the center, such as the date and time of next periodic communication, the copy number designating the next copy number communication, threshold values which are references to determine the necessity of alarming communication, etc.

After transmitting the count data and the element data to the center in the first mode as described above at step S74a, the CPU 11 receives data from the center at step S74b. If the difference between the values of the total copy counter is over 100 ("YES" at step S81), after sending the count data and element data at step S85, the CPU 11 receives data from the center following the procedure shown by FIG. 11. More specifically, the CPU 11 receives the date and time of next periodic communication at step S112 and receives threshold values of the items of element data which have changed since the previous periodic communication at step S113, and these received data are stored in the SRAM 15. Even if the difference between the values of the total copy counter is not more than 100 ("NO" at step S81), when mode 2 or mode 3 is selected ("YES" at step S111), the CPU receives data from the center in the same manner. However, when mode 1 is selected, the CPU 11 does not communicate with the center, and the date and time of next periodic communication is calculated from the data stored in the SRAM 15 at step S114. For example, the date and time of next periodic communication is set to be seven days after. This is a longer period than the reference period at step S91 (see FIG. 9) in a second mode of count data/element data transmission, which will be described later.

Figure 9:
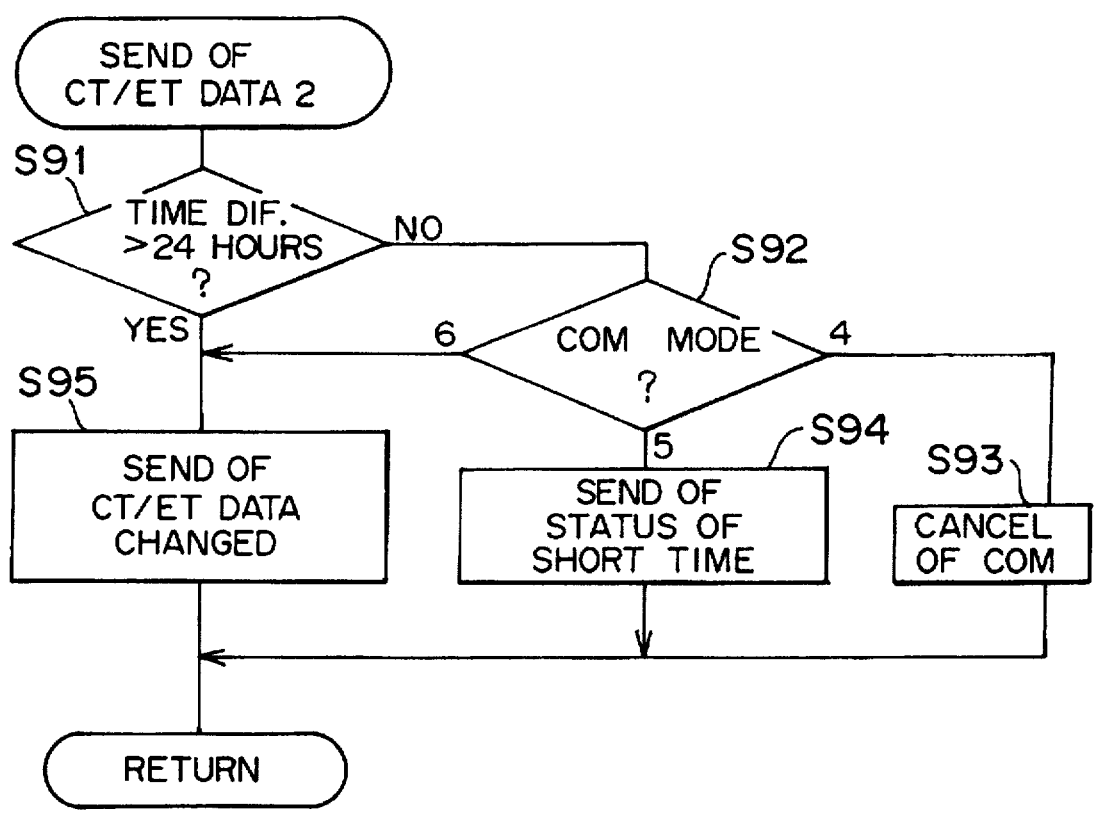
FIG. 9 is a flowchart showing the procedure of a second mode of count data/element data transmission carried out in the flowchart of FIG. 7.

When copy number communication is to be carried out ("YES" at step S75), count data and element data are transmitted to the center at step S75a in the second mode shown by FIG. 9. The present time indicated by the clock 17 is compared with the time stored in the SRAM 15 as the time of previous copy number communication, and if the difference is over 24 hours ("YES" at step S91), items of count data and element data which have changed since the previous copy number communication are transmitted at step S95.

If the difference is not more than 24 hours ("NO" at step S91), the communication is carried out according to the mode selected by use of the dip switches. For example, if mode 4 is selected, the communication is canceled at step S93. If mode 5 is selected, a status which indicates that it is a short time since the previous copy number communication is transmitted at step S94. If mode 6 is selected, count data and element data are transmitted at step S95 in the same manner as the case wherein the difference is over 24 hours. Further, as a possible modification of mode 4, in the next communication (for example, alarming communication) after the cancellation at step S83, a status which indicates that the previous copy number communication was canceled is sent. It is also possible to, when the count data and the element data are judged at step S95 to be very similar to those transmitted in the previous copy number data transmission, send such information to the center.

After transmitting the count data and the element data to the center in the second mode as described above at step S75a, the CPU 11 receives data from the center at step S75b. If the time difference is over 24 hours ("YES" at step S91), after sending the count data and element data at step S95, the CPU receives data from the center following the procedure shown by FIG. 12. More specifically, the CPU 11 receives the copy number at which the next copy number communication is to be carried out at step S122 and receives threshold values of the items of element data which have changed since the previous copy number communication at step S123, and these received data are stored in the SRAM 15. Even if the time difference is not more than 24 hours ("NO" at step S91), when mode 5 or mode 6 is selected ("YES" at step S122), the CPU 11 receives data from the center in the same manner. However, when mode 4 is selected, the CPU 11 does not communicate with the center, and the copy number at which the next copy number communication is to be carried out is calculated from the data stored in the SRAM 15 at step S114. For example, the copy number is set to be 1000. This is a larger number than the reference number at step S81 (see FIG. 8) in the first mode of count data/element data transmission.

In manual communication ("YES" at step S76), all the count data and element data in the SRAM 15 are transmitted to the center at step S76a, whereas in regular communication (periodic communication and copy number communication), only items of count data and element data which have changed since the previous regular communication are transmitted (see step S85 of FIG. 8 and step S95 of FIG. 95). In other words, all the data can be transmitted to the center by conducting manual communication.

Although the present invention has been described in connection with the preferred embodiment, it is to be noted that various changes and modifications are possible to those who are skilled in the art. Such changes and modifications are to be understood as being within the scope of the present invention.

What is claimed is:

1. An image forming apparatus which communicates with a central supervisory apparatus, said image forming apparatus comprising:

detecting means for detecting a condition of the image forming apparatus;

a timer for timing a specified period;

communication means for sending a communication to the central supervisory apparatus to transmit data about the condition of the image forming apparatus at each specified period;

a counter for counting imaged sheets made by the image forming apparatus during the specified period; and communication control means for controlling the communication with the central supervisory apparatus in accordance with a value of the counter;

wherein when the value of the counter is not more than a reference value, the communication control means inhibits the communication with the central supervisory apparatus.

2. An image forming apparatus as claimed in claim 1, wherein:

the data about the condition of the image forming apparatus which are transmitted to the central supervisory apparatus include a number of sheets which have been used for image formation.

3. An image forming apparatus which communicates with a central supervisory apparatus, said image forming apparatus comprising:

detecting means for detecting a condition of the image forming apparatus;

a counter for counting imaged sheets made by the image forming apparatus;

communication means for communicating with the central supervisory apparatus to transmit data about the condition of the image forming apparatus every time a specified number of imaged sheets are made;

a memory for storing the data about the condition transmitted to the central supervisory apparatus by the communication means;

comparison means for comparing the data which were transmitted to the central supervisory apparatus in previous communication and are stored in the memory with the currently detected condition of the image forming apparatus; and communication control means for controlling the communication means to send only items of data which have changed since the previous communication, judging from a result of the comparison means.

4. An image forming apparatus as claimed in claim 3, wherein:

the data about the condition of the image forming apparatus which are transmitted to the central supervisory apparatus include a surface potential of a photosensitive member and a toner density in a developer.

5. An image forming apparatus which communicates with a central supervisory apparatus, said image forming apparatus comprising:

detecting means for detecting a condition of the image forming apparatus;

a counter for counting imaged sheets made by the image forming apparatus;

communication means for communicating with the central supervisory apparatus to transmit data about the condition of the image forming apparatus every time a specified number of imaged sheets are made;

a timer for detecting a time which it has taken to make the specified number of imaged sheets;

comparison means for comparing a value of the timer with a reference value; and communication control means for controlling the communication with the central supervisory apparatus in accordance with a result of the comparison means.

6. An image forming apparatus as claimed in claim 5, wherein:

when the value of the timer is not more than the reference value, the communication control means inhibits the communication with the central supervisory apparatus.

7. An image forming apparatus as claimed in claim 5, wherein:

when the value of the timer is not more than the reference value, the communication control means controls the communication means to send information that the time which it has taken to make the specified number of imaged sheets is shorter than the reference value.

8. An image forming apparatus as claimed in claim 5, wherein:

the data about the condition of the image forming apparatus which are transmitted to the central supervisory apparatus include a surface potential of a photosensitive member.

9. An image forming apparatus as claimed in claim 5, wherein:

the data about the condition of the image forming apparatus which are transmitted to the central supervisory apparatus include a toner density in a developer.

10. An image forming apparatus which communicates with a central supervisory apparatus, said image forming apparatus comprising:

detecting means for detecting a condition of the image forming apparatus;

a timer for timing a specified period;

communication means for communicating with the central supervisory apparatus to transmit data about the condition of the image forming apparatus every the specified period;

a memory for storing the data about the condition transmitted to the central supervisory apparatus by the communication means;

comparison means for comparing the data about the condition which were transmitted to the central supervisory apparatus in previous communication and are stored in the memory with the currently detected condition of the image forming apparatus; and communication control means for controlling the communication with the central supervisory apparatus in accordance with a result of the comparison means.

11. An image forming apparatus as claimed in claim 10, wherein:

when the comparison means obtains a result that the currently detected condition of the image forming apparatus is substantially equal to the condition at the time of previous communication, the communication control means inhibits the communication with the central supervisory apparatus.

12. An image forming apparatus as claimed in claim 10, wherein:

when the comparison means obtains a result that the currently detected condition of the image forming apparatus is substantially equal to the condition at the time of previous communication, the communication control means controls the communication means to send information that the condition of the image forming apparatus has not changed.

13. An image forming apparatus which communicates with a central supervisory apparatus, said image forming apparatus comprising:

detecting means for detecting a condition of the image forming apparatus;

a counter for counting imaged sheets made by the image forming apparatus;

communication means for communicating with the central supervisory apparatus to transmit data about the condition of the image forming apparatus every time the specified number of imaged sheets are made;

a memory for storing the data about the condition transmitted to the central supervisory apparatus by the communication means;

comparison means for comparing the data about the condition which were transmitted to the central supervisory apparatus in previous communication and are stored in the memory with the currently detected condition of the image forming apparatus; and communication control means for controlling the communication with the central supervisory apparatus in accordance with a result of the comparison means.

14. An image forming apparatus as claimed in claim 13, wherein:

when the comparison means obtains a result that the currently detected condition of the image forming apparatus is substantially equal to the condition at the time of previous communication, the communication control means inhibits the communication with the central supervisory apparatus.

15. An image forming apparatus as claimed in claim 13, wherein:

when the comparison means obtains a result that the currently detected condition of the image forming apparatus is substantially equal to the condition at the time of previous communication, the communication control means controls the communication means to send information that the condition of the image forming apparatus has not changed.

16. An image forming apparatus which communicates with a central supervisory apparatus, said image forming apparatus comprising:

detecting means for detecting a condition of the image forming apparatus;

a timer for timing a specified period;

communication means for communicating with the central supervisory apparatus to transmit data about the condition of the image forming apparatus every the specified period;

a memory for storing the data about the condition transmitted to the central supervisory apparatus by the communication means;

comparison means for comparing the data about the condition which were transmitted to the central supervisory apparatus in previous communication and are stored in the memory with the currently detected condition of the image forming apparatus; and communication control means for controlling the communication means to send only items of data which have changed since the previous communication, judging from a result of the comparison means.

17. An image forming apparatus as claimed in claim 16, wherein:

the data about the condition of the image forming apparatus which are transmitted to the central supervisory apparatus include a surface potential of a photosensitive member, a toner density in a developer and a number of sheets used for image formation.

18. An image forming apparatus central supervisory apparatus, said image forming apparatus comprising:

detecting means for detecting a condition of the image forming apparatus;

communication means for sending a communication to the central supervisory apparatus to transmit data about the condition of the image forming apparatus at each specified period;

a counter for counting imaged sheets made by the image forming apparatus during the specified period; and communication control means for controlling the communication with the central supervisory apparatus in accordance with a value of the counter;

wherein when the value of the counter is not more than a reference value, the communication control means controls the communication means to send a signal that the number of imaged sheets is not more than the reference value.

* * * * *